United States Patent [19]

Kume

[11] Patent Number: 5,197,282
[45] Date of Patent: Mar. 30, 1993

[54] SECONDARY AIR SUPPLY SYSTEM FOR ENGINE UNIT

[75] Inventor: Taketsugu Kume, Shizuoka, Japan

[73] Assignee: Suzuki Kabushiki Kaisha, Japan

[21] Appl. No.: 795,816

[22] Filed: Nov. 21, 1991

[30] Foreign Application Priority Data

Nov. 22, 1990 [JP] Japan ................... 2-316046

[51] Int. Cl.⁵ .............................. F01N 3/32
[52] U.S. Cl. ................................... 60/307
[58] Field of Search ............................ 60/307

[56] References Cited

U.S. PATENT DOCUMENTS

| | | | |
|---|---|---|---|
| 3,106,821 | 10/1963 | Ridgway | 60/307 |
| 3,672,172 | 6/1972 | Hammond | 60/307 |
| 4,085,586 | 4/1978 | Shibata | 60/307 |
| 4,096,692 | 6/1978 | Nakamura | 60/307 |

FOREIGN PATENT DOCUMENTS 18519 2/1977 Japan ................... 60/307

*Primary Examiner*—Douglas Hart
*Attorney, Agent, or Firm*—Bruce L. Adams; Van C. Wilks

[57] ABSTRACT

A secondary air supply system of a vehicle, including an engine unit having a crank chamber and being operatively connected to an air cleaner and an exhaust system including an exhaust pipe, comprises a diaphragm pump device provided with an inner chamber and having an air inlet port and an air outlet port both being communicated with the inner chamber, a diaphragm disposed in the inner chamber to divide it into a diaphragm chamber and a pump chamber, a first hose connecting the air inlet port and the air cleaner to introduce a secondary air from the air cleaner into the pump chamber, a second hose connecting the air outlet port and the exhaust pipe to supply the secondary air into the exhaust pipe through the outlet port, and a third hose connecting the diaphragm chamber of the diaphragm pump device and the crack chamber of the engine unit. The secondary air is supplied into the exhaust pipe through the diaphragm pump by an amount in proportion to a magnitude of an oscillation of the diaphragm caused in accordance with a pressure variation in the crank chamber caused in proportion to an engine revolution speed. A valve assembly is further disposed in the pump chamber for allowing the secondary air introduced into the pump chamber to flow uni-directionally from the inlet port to the outlet port.

5 Claims, 2 Drawing Sheets

SECONDARY AIR SUPPLY SYSTEM FOR ENGINE UNIT

BACKGROUND OF THE INVENTION

The present invention relates to a secondary air supply system for an engine unit, particularly for a two-stroke cycle engine of a vehicle.

In a known four- or two-stroke cycle engine unit of a vehicle such as an automobile or motorcycle a piston of a piston-cylinder assembly performs a reciprocal motion in a cylinder and an exhaust gas exhausted from an engine is fed into an exhaust pipe to which a catalyst is provided for the purification of the exhaust gas through an oxidation reaction. This oxidation reaction is carried out by supplying air into the exhaust pipe called secondary air for the engine unit, in comparison with an air to be mixed with a fuel as a primary air. The secondary air is generally fed into the exhaust pipe through a one-way valve by the utilization of a pressure variation, i.e. pulsation, of the exhaust gas in the exhaust pipe to thereby suck the secondary air thereinto, or the secondary air is supplied by the actuation of a pump means attached to the engine unit.

In the former type, in which the one-way valve is incorporated, such secondary air supply system can be constructed relatively easily with no increased cost, but in the employment of such type structure, less intake air is fed at a time of an engine high-power operation period, i.e., engine high revolution speed operation, at which time voluminous exhaust gas is discharged, resulting in insufficient purification of the engine exhaust gas.

In the latter type, in which a pump means is employed, it may be possible to supply the secondary air in proportion to the engine exhaust gas amount, but this will result in an output power loss of the engine, and further, the mounting of such pump means requires modification of or design changes to an existing exhaust gas exhausting unit.

SUMMARY OF THE INVENTION

Accordingly, an object of the present invention is to substantially eliminate defects or drawbacks encountered in the prior art and to provide a secondary air supply system for an engine unit of a vehicle capable of possibly reducing a power output loss of the engine and capable of supplying the secondary air into an exhaust pipe by an amount in proportion to an exhaust gas from the engine unit, particularly for a two-stroke cycle engine unit of a vehicle.

This and other objects can be achieved according to the present invention by providing a secondary air supply system of a vehicle including an engine unit having a crank chamber and being operatively connected to an air cleaner and an exhaust system including an exhaust pipe, comprising a diaphragm pump means provided with an inner chamber means and having an air inlet port and an air outlet port both being communicated with the inner chamber means, a diaphragm disposed in the chamber means to divide the inner chamber means into a diaphragm chamber and a pump chamber, a first hose connecting the air inlet port and the air cleaner to introduce a secondary air from the air cleaner into the pump chamber of the diaphragm pump means through the inlet port, a second hose connecting the air outlet port and the exhaust pipe to supply the secondary air from the diaphragm pump means into the exhaust pipe through the outlet port, and a third hose connecting the diaphragm chamber of the diaphragm pump means and the crank chamber of the engine unit, wherein the quantity secondary air is supplied into the exhaust pipe through the diaphragm pump in proportion to the magnitude of an oscillation of the diaphragm caused in accordance with a pressure variation in the crank chamber which occurs in proportion to the engine revolution speed.

In a preferred embodiment, a valve assembly is further disposed in the pump chamber for allowing the secondary air introduced into the pump chamber to flow uni-directionaly from the inlet port to the outlet port. The pump chamber is composed of a first pump chamber communicated with the inlet port, a second pump chamber communicated with the outlet port and a common passage chamber connecting the first and second pump chambers and wherein the valve assembly comprises a first one-way valve disposed in the first pump chamber and a second one-way valve disposed in the second pump chamber, the first one-way valve being operated to introduce the secondary air into the first pump chamber when the diaphragm is displaced so as to increase an inner volume of the pump chamber and the second one-way valve being operated to discharge the secondary air from the second pump chamber when the diaphragm is displaced so as to decrease the inner volume of the pump chamber.

The secondary air supply system is preferably functioned when used for the two-stroke cycle engine unit.

According to the secondary air supply system for the engine unit of the character described above, a pressure variation is caused in the crank chamber of the engine unit by the reciprocation of the piston. This pressure variation is transferred to the diaphragm pump device through the connection hose, and the diaphragm disposed in the diaphragm chamber of the pump device is oscillated. In proportion to the magnitude of the pressure variation, the diaphragm is oscillated thereby to vary the inner volume of the pump chamber of the pump device. Accordingly, in proportion to the magnitude and the frequency of the pressure variation, the secondary air is supplied in a regulated manner into the exhaust pipe through the diaphragm pump device of the present invention.

BRIEF DESCRIPTION OF THE DRAWINGS

For a better understanding of the present invention and to show how the same is carried out, reference will be made, by way of a preferred embodiment, to the accompanying drawings, in which.

DESCRIPTION OF THE PREFERRED EMBODIMENT

Figure 1:
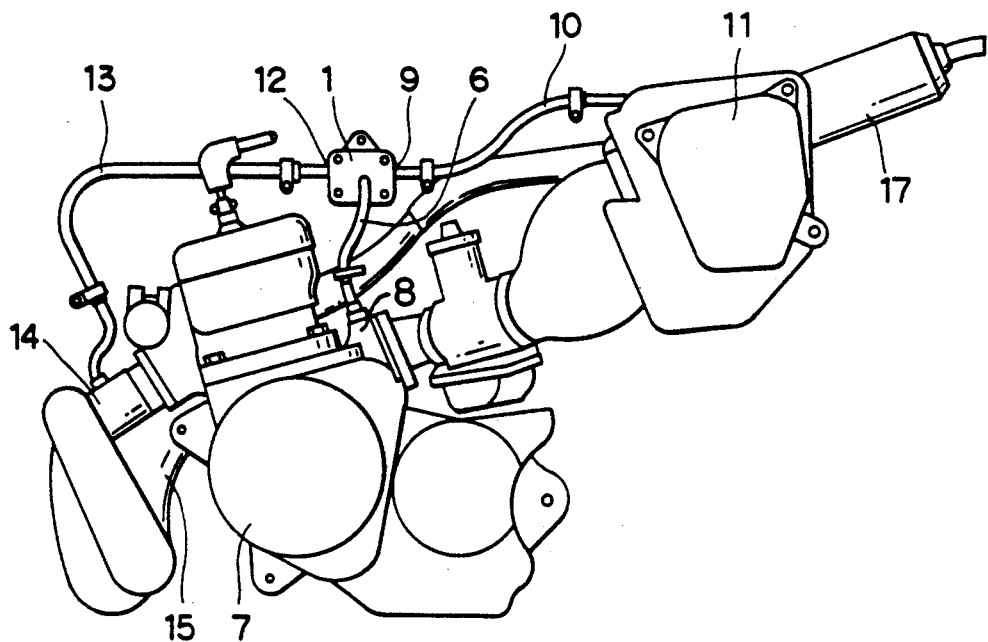
FIG. 1 is a schematic side view of an exhaust system in association with a two-stroke cycle engine unit to which a secondary air supply system according to the present invention is applied.
Figure 2:
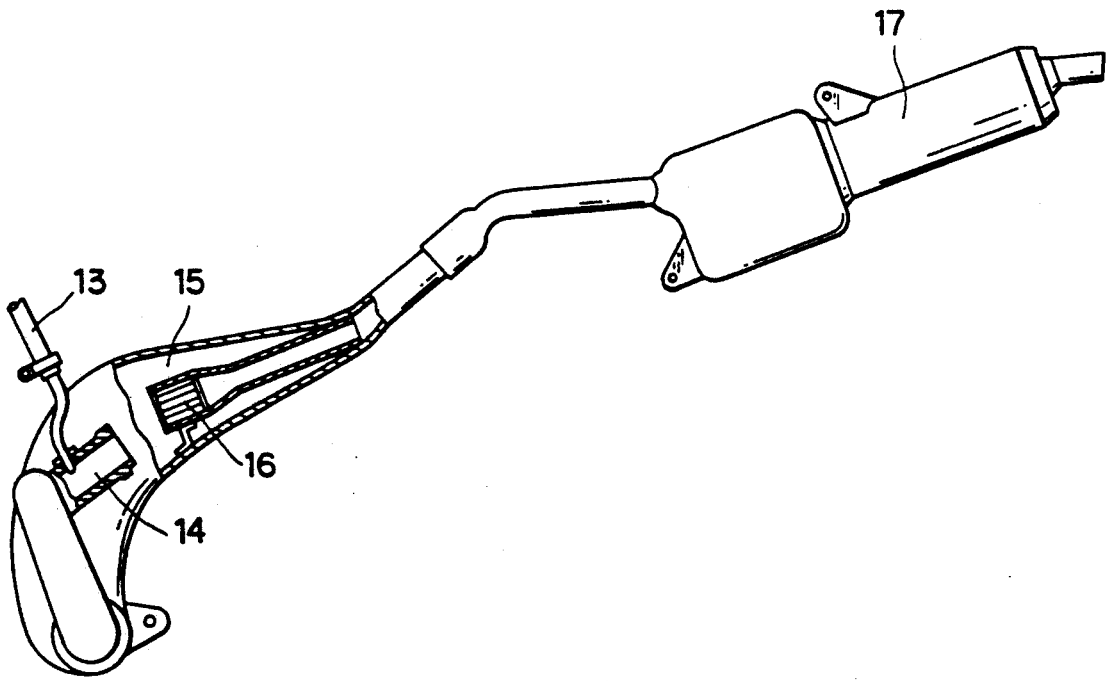
FIG. 2 is a schematic view, partially in section, of the exhaust system of FIG. 1.

First, referring to FIG. 1, a two-stroke cycle engine unit 7 is provided with a combustion chamber, not shown, into which an air is supplied from an air cleaner 11. The engine unit 7 is provided with an exhaust gas port, not shown, through which an exhaust pipe 14 is connected. As shown in FIG. 2, the exhaust pipe 14 is connected to and communicated with an expansion chamber 15, which is then connected to and communicated with a muffler 17. The exhaust pipe 14 has a portion, located in the expansion chamber 15, to which a catalyst 16 is disposed for performing an oxidation reaction for the purification of the exhaust gas.

The air introduced from the air cleaner 11 into the combustion chamber of the engine unit 7, so-called primary air, is mixed with a fuel therein and the mixture is then exploded by the actuation of piston-cylinder assembly incorporated in the engine unit. The exhaust gas caused by the explosion is exhausted into the exhaust pipe 14 through the engine exhaust port, and the exhaust gas is then discharged externally through the muffler 17 after the silencing operation.

In the above structure, the air cleaner 11 is communicated with the exhaust pipe 14 through connection means having suitable flexibility and rigidity such as hose means 10 and 13, and a diaphragm pump 1 is incorporated to this connection means. Namely, as shown in FIG. 1, one hose 10 extending from the air cleaner 11 is connected to an inlet port 9 of the diaphragm pump 1 at one end thereof and the other hose 13 has one end connected to an outlet port 12 of the diaphragm pump 1 and the other end connected to the exhaust pipe 14.

Figure 3:
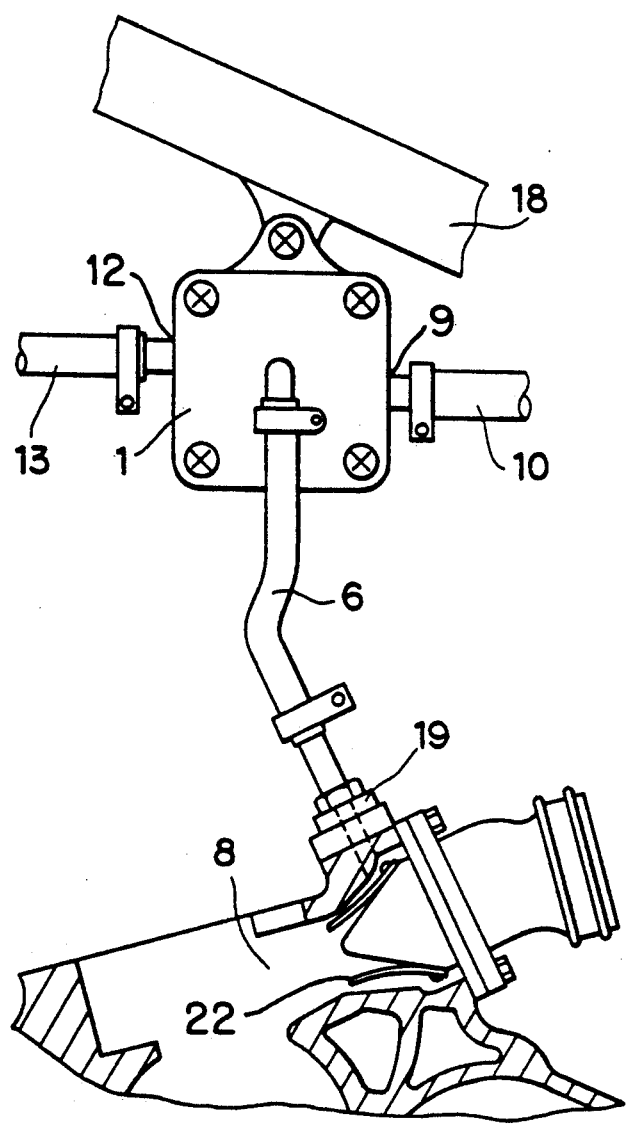
FIG. 3 is a side view, in an enlarged scale, of the secondary air supply system shown in FIG. 1 according to one embodiment of the present invention.

The diaphragm pump 1 is further connected to a crank chamber 8 of the two-stroke cycle engine 7 through a hose 6 as best shown in FIG. 3. The connection of the hose 6 to the engine unit 7 can be easily made by preliminarily forming a connection hole to the engine crank chamber 8 and, in actuality, the connection is carried out by fixing one end of the hose 6 to the hole of the engine unit by a proper fastening means 19 of known structure. As illustrated in FIG. 3, this connection of the hose 6 to the engine crank chamber 8 is effected by having an open end of the hose 6 open into the crank chamber 8 at a location near a reed valve 22 and opened in a direction that is normal to the direction of flow of an air/fuel mixture at that location, such location being a connection port between the crank chamber and a carburetor. As described above, since the diaphragm pump 1 is supported by the air cleaner 11 and the exhaust pipe through the hoses 10 and 13 having proper flexibility and rigidity, the diaphragm pump 1 can be itself easily secured to a body of an automobile such as frame member 18 thereof.

In preferred modifications, these hoses 10 and 13 may be connected to the inlet and outlet ports 9 and 12 through connection fittings, or nozzle members for the connection of these hoses 10 and 13 may be formed to the inlet and outlet ports 9 and 12.

Figure 4:
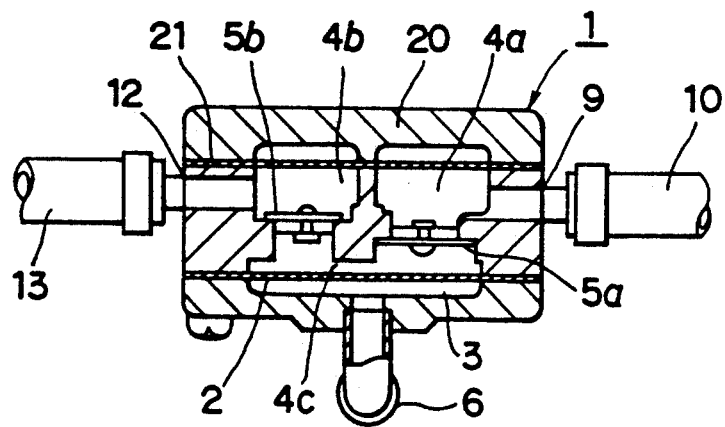
FIG. 4 is a sectional view of a diaphragm pump incorporated in the secondary air supply system shown in FIG. 3.

The diaphragm pump 1 has a structure as shown in FIG. 4 as a longitudinal section thereof.

Referring to FIG. 4, the diaphragm pump 1 comprises a pump housing 20 in which an inner chamber means is defined. The inner chamber means is composed of a first pump chamber 4a, a second pump chamber 4b and a common chamber which communicates the first and second pump chambers 4a and 4b, and the common chamber is divided into a diaphragm chamber 3 and a passage chamber 4c as a portion of the pump chamber, which communicates the first and second pump chambers 4a and 4b, by means of a diaphragm 2 which is made of a thin metal film, for example. One-way valves 5a and 5b are incorporated in the inner chamber means at portions communicating the first and second pump chambers 4a and 4b with the passage chamber 4c. The first pump chamber 4a is connected to and communicated with the inlet port 9 to which the hose 10 is connected and the second pump chamber 4b is also connected to and communicated with the outlet port 12 to which the hose 13 is connected. The diaphragm chamber 3 is communicated with the crank chamber 8 through the hose 6. Reference numeral 21 denotes a gasket.

According to the structure of the diaphragm pump 1 described above, the air, i.e. secondary air from the air cleaner 11 is introduced into the first pump chamber 4a through the hose 10 and the inlet port 9 and is discharged towards the exhaust pipe 14 through, in order, the first one-way valve 5a, the passage chamber 4c, the second one-way valve 5b, the second pump chamber 4b, the outlet port 12 and the hose 13. In this air flow, when the pressure variation is caused in the engine crank chamber 8 due to the explosion of the air-fuel mixture, the diaphragm 2 is oscillated because this pressure variation is transferred to the diaphragm chamber 3 through the hose 6. According to this oscillation of the diaphragm 2, the volume of the passage chamber 4c, and thus the entire pump chamber, comprised of the first and second pump chambers 4a and 4b, and passage chamber 4c, varies.

When the volume of the pump chamber is increased, with reference to FIG. 4, the diaphragm 2 is displaced downwardly, the secondary air is sucked into the diaphragm pump 1 through the inlet port 9 and then flows therein through the first one-way valve 5a, and when the volume of the pump chamber is then decreased, that is, the diaphragm 2 is displaced upwardly, the secondary air is exhausted into the hose 13, connected to the exhaust pipe 14, through the second one-way valve 5b and the outlet port 12.

As described above, the oscillation of the diaphragm 2 becomes violent in proportion to the increasing of the engine revolution speed and, hence, the amount of the exhaust gas. Accordingly, the air supply amount from the air cleaner 11 into the exhaust pipe 14 can be precisely regulated in proportion to the engine revolution speed, that is, in accordance with the amount of exhaust gas.

It is easily understood that the present embodiment was described with reference to the two-stroke cycle engine, but it may be applied to a four-stroke cycle engine as well.

What is claimed is:

1. A secondary air supply system for use with a vehicle having an engine unit having a crank chamber which has a reed valve for controlling gas mixture flow and being connected to an air cleaner and an exhaust system including an exhaust pipe, the secondary air supply system comprising:

diaphragm pump means provided with an inner chamber means and having an air inlet port and an air outlet port both being communicated with the inner chamber means;

a diaphragm disposed in the inner chamber means to divide the inner chamber means into a diaphragm chamber and a pump chamber;

first hose means connecting the air inlet port and the air cleaner to introduce a secondary air from the air cleaner into the pump chamber of the diaphragm pump means through the inlet port;

second hose means connecting the air outlet port and the exhaust pipe to supply the secondary air from the diaphragm pump means into the exhaust pipe through the outlet port;

third hose means having one open end opening into the diaphragm chamber of the diaphragm pump means and another open end opening into the crank chamber at a location near the reed valve in a direction normal to gas mixture flow at that location;

wherein the secondary air is supplied into the exhaust pipe through the diaphragm pump by an amount in proportion to an oscillation of the diaphragm caused in accordance with a pressure variation in the crank chamber caused in proportion to an engine revolution speed.

2. A secondary air supply system according to claim 1, further comprising a valve means disposed in the pump chamber for allowing the secondary air introduced into the pump chamber to flow uni-directionaly from the inlet port to the outlet port.

3. A secondary air supply system according to claim 2, wherein the pump chamber is composed of a first pump chamber communicated with the inlet port, a second pump chamber communicated with the outlet port and a common passage chamber connecting the first and second pump chambers and wherein the valve means comprises a first one-way valve disposed in the first pump chamber and a second one-way valve disposed in the second pump chamber, said first one-way valve being operated to introduce the secondary air into the first pump chamber when the diaphragm is displaced so as to increase an inner volume of the pump chamber and said second one-way valve being operated to discharge the secondary air from the second pump chamber when the diaphragm is displaced so as to decrease the inner volume of the pump chamber.

4. A secondary air supply system according to claim 1, wherein the engine unit is a two-stroke cycle engine of a vehicle.

5. A secondary air supply system according to claim 1, wherein the engine unit is a four-stroke cycle engine of a vehicle.

* * * * *